US012236278B2

(12) United States Patent
Salim et al.

(10) Patent No.: US 12,236,278 B2
(45) Date of Patent: Feb. 25, 2025

(54) OPTIMIZATION OF VIRTUAL WAREHOUSE COMPUTING RESOURCE ALLOCATION

(71) Applicant: Capital One Services, LLC, McLean, VA (US)

(72) Inventors: Syed Shamaz Salim, North Potomac, MD (US); Ganesh Bharathan, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 553 days.

(21) Appl. No.: 17/590,372

(22) Filed: Feb. 1, 2022

(65) Prior Publication Data

US 2023/0244538 A1    Aug. 3, 2023

(51) Int. Cl.
*G06F 9/50* (2006.01)
*G06F 16/25* (2019.01)

(52) U.S. Cl.
CPC .......... *G06F 9/5055* (2013.01); *G06F 16/252* (2019.01)

(58) Field of Classification Search
CPC .... G06F 9/5055; G06F 16/252; G06F 9/5077; G06F 16/256
See application file for complete search history.

(56) References Cited

U.S. PATENT DOCUMENTS

| 10,970,303 | B1 | 4/2021 | Denton et al. |
| 11,537,575 | B1 * | 12/2022 | McNair ............... G06F 11/3409 |
| 2010/0257513 | A1 | 10/2010 | Thirumalai et al. |
| 2012/0131591 | A1 | 5/2012 | Moorthi et al. |
| 2013/0117305 | A1 | 5/2013 | Varakin et al. |
| 2014/0006384 | A1 | 1/2014 | Jerzak et al. |
| 2014/0089495 | A1 | 3/2014 | Akolkar et al. |
| 2017/0316078 | A1 | 11/2017 | Funke et al. |

(Continued)

FOREIGN PATENT DOCUMENTS

WO    2020228378 A1    11/2020

OTHER PUBLICATIONS

May 9, 2023 (WO) International Search Report and Written Opinion—App PCT/US2023/011421, 20 pages.

(Continued)

*Primary Examiner* — Dong U Kim
(74) *Attorney, Agent, or Firm* — Banner & Witcoff, Ltd.

(57) ABSTRACT

Methods, systems, and apparatuses for optimizing the configuration of virtual warehouses for execution of queries on one or more data warehouses are described herein. A plurality of different events associated with a data sharing platform may be logged. The data sharing platform may enable users to access one or more databases managed by the data sharing platform. The data sharing platform may be configured to provide access to the data stored by the data sharing platform via one or more of a plurality of virtual warehouses. A testing database may be generated. An optimized virtual warehouse configuration may be predicted for a first virtual warehouse by selecting a plurality of different warehouse configurations for the first virtual warehouse, measuring performance parameters of each of the plurality of different warehouse configurations by emulating, and selecting the optimized virtual warehouse configuration based on the performance parameters.

20 Claims, 7 Drawing Sheets

(56) References Cited

U.S. PATENT DOCUMENTS

| | | | |
|---|---|---|---|
| 2021/0089560 A1 | 3/2021 | Funke et al. | |
| 2021/0097076 A1* | 4/2021 | Rajaperumal | G06F 16/24539 |
| 2021/0334283 A1 | 10/2021 | Gladwin et al. | |
| 2021/0342360 A1 | 11/2021 | Cseri et al. | |

OTHER PUBLICATIONS

Yan, et al., "Snowtrail: Testing with Production Queries on a Cloud Database," Proceedings of the Workshop on Testing Database Systems, Jun. 15, 2018, pp. 1-6.

Aug. 16, 2021, VentureBeat, Lazzaro, "How to migrate to Snowflake without getting 'data drunk'," <<https://venturebeat.com/2021/08/16/how-to-migrate-to-snowflake-without-getting-data-drunk/>>, 8 pages.

Nadilytics—The Intelligence Platform on top of Snowflake. Retreived from https://www.nadilytics.com/, retrieved online May 14, 2021, at 4:25:15 pm.

Snowflake for Data Sharing, Snowflake Workloads, <https://www.snowflake.com/workloads/data-sharing/>>, date of publication unknown but, prior to Jul. 13, 2021, 3 pages, published Aug. 2020.

Data Governance is Worth the Time and Trouble, << https://www.snowflake.com/trending/data-governance-framework>>, date of publication unknown but, prior to Jul. 13, 2021, 14 pages.

Working with Secuve Views, Snowflake Documention, <<https://docs.snowflake.com/en/user-guide/views-secure.html>>, date of publication unknown but, prior to Jul. 13, 2021, 3 pages, published Aug. 2020.

Data governance with Snowflake: 3 things you need to know, <<https://www.talend.com/resources/data-governance-snowflake-3-things-to-know/, date of publication unknown but, prior to Jul. 13, 2021, 11 pages.

GPDR: A quick way to reduce scope, <<https://www.talend.com/resources/anonymize-data/>>, date of publication unknown but, prior to Jul. 13, 2021, 6 pages.

Jun. 14, 2019, Mushtaq, Data preprocessing in detail, <<https://developer.ibm.com/technologies/data-science/articles/data-preprocessing-in-detail/>>, 9 pages.

Wikipedia, Data pre-processing, <<https://en.wikipedia.org/wiki/Data_pre-processing>>, date of publication but, prior to Jul. 13, 2021, 4 pages.

Snowflake Data Exchange, <<https://resources.snowflake.com/solution-briefs/data-exchange-solution-brief>>, date of publication unknown but, prior to Jul. 13, 2021, 2 pages.

Zhao, et al., "SLA-based Profit Optimization Resource Scheduling for Big Data Analytics-as-a-Service Platforms in Cloud Computing Environments," IEEE Transactions on Cloud Computing, Dec. 27, 2018.

* cited by examiner

OPTIMIZATION OF VIRTUAL WAREHOUSE COMPUTING RESOURCE ALLOCATION

FIELD OF USE

Aspects of the disclosure relate generally to data storage and retrieval. More specifically, aspects of the disclosure relate to managing virtual warehouses which execute queries with respect to a plurality of data warehouses.

BACKGROUND

The Snowflake architecture, produced by Snowflake Inc. of San Mateo, CA, permits organizations to logically separate but natively integrate storage, computing, and services. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. Snowflake and similar "data warehouse as a service" platforms may thereby allow users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

In addition to avoiding resource limitations associated with queries, another advantage of the Snowflake architecture is that it allows users to collect data in a way that is resilient. Because a user's laptop may be relatively underpowered, queries that request significant amounts of data may crash the laptop. Moreover, because a single device collects the results of a query, unexpected technical issues (e.g., power loss, Internet disconnects) may cause the entire query to fail. The Snowflake architecture is equipped with built-in replication and failover/failback procedures which avoid such crashes, thereby ensuring that data continuity may be preserved. That said, such robustness can come with a caveat: because the Snowflake architecture can handle larger and more robust queries, a user may submit a malformed or overly broad query and thereby inadvertently cause a virtual warehouse to spend considerable time and computing resources.

One way in which the Snowflake architecture improves conventional query execution is that Snowflake allows virtual warehouses to be created, modified, and destroyed as desired. This allows multiple queries to be executed simultaneously but separately. For example, the Snowflake architecture allows a first user from an organization to execute a first query in a first virtual warehouse at the same time that a second user from the same organization executes a second query in a second virtual warehouse. To preserve computing resources, the different virtual warehouses may be configured with different computing resources. Commonly, such virtual warehouses may be referred to as "extra-large," "large," "medium," or "small" (that is, the virtual warehouses may be in "t-shirt sizes"), referring to a different relative quantity of computing resources available to a virtual warehouse. For example, a virtual warehouse for large, significant, and/or time-sensitive queries may be an "extra-large" virtual warehouse (and have a significant quantity of computing resources), whereas a virtual warehouse for relatively smaller, less significant, and/or more time-insensitive queries may be a "small" virtual warehouse (and have a relatively small quantity of computing resources). The quantity of computing resources might be subdivided into different "nodes," such that, for example, a "large" virtual warehouse may comprise eight nodes, whereas a "small" virtual warehouse may comprise two nodes.

It can be difficult to determine how large or small a particular virtual warehouse should be, particularly in view of the large and somewhat unpredictable nature of events executed by virtual warehouses. During the course of a month, a particular virtual warehouse may receive thousands of different queries, may collect and sort millions of different rows of data, and generally may be used by a wide variety of different users of an organization. That said, the nature of the queries (e.g., whether a query takes ten seconds or ten hours to complete) provided by users may change. As is the case with virtual warehouses, such queries may vary in so-called "t-shirt sizes" (e.g., extra-large, large, medium, small) based on the processing complexity of those queries (and, e.g., in turn, the processing time required to complete the query, which may itself be a function of computing resources available to complete the query). Moreover, the frequency of queries provided by users may vary: for example, a large quantity of smaller (e.g., easily processed) queries may be provided during the workday, whereas a smaller quantity of large (e.g., time-consuming) queries may be presented outside of work hours (and, e.g., as part of nighttime automated operations). As such, it is not uncommon for virtual warehouses to be improperly sized. For example, an organization may maintain an unnecessarily large virtual warehouse which processes and manages queries quickly but may cost that organization tens of thousands of extra dollars per month. As another example, an organization may maintain an unnecessarily small virtual warehouse which is cheap but which takes excessively long amounts of time to process and manage queries.

Aspects described herein may address these and other problems, and generally improve the quality, efficiency, and speed of the management of virtual warehouses as those workspaces are tasked with queries.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to optimizing the sizing of virtual warehouses. The process depicted herein balances the cost of virtual warehouses (which generally increases with the size of those virtual warehouses) with the efficiencies size provides in handling queries. In this manner, the aspects described herein optimize virtual warehouses for organizations. In particular, by emulating events indicated by a log of events that occurred with respect to deployed virtual warehouses, a virtual warehouse can be tested with a variety of different configurations (e.g., at a variety of different sizes) such that an optimal configuration may be identified. To perform such testing, a testing database (e.g., a zero-copy database) may be generated which represents actual data at a particular point in time. In this manner, the emulated events may be real events emulated with respect to real data, such that realistic performance parameters may be collected, and those performance parameters may be used to select an optimized configuration for a virtual warehouse. In turn, the testing process described herein leverages key functionalities of virtual warehouse as a service platforms (e.g., the Snowflake platform) in order to efficiently size virtual warehouses.

As one example of how aspects described herein may be performed, a computing device may be configured to log a plurality of different events associated with a data sharing platform. That data sharing platform, which may be the same as or similar to the Snowflake platform, may enable users to access one or more databases managed by the data sharing platform. The data sharing platform may be configured to provide access to the data stored by the data sharing platform via one or more of a plurality of virtual warehouses. Each of the plurality of virtual warehouses may comprise a respective set of computing resources configured to, e.g., execute one or more queries with respect to at least a portion of a plurality of data warehouses, collect results from the one or more queries, and provide access to the collected results. The computing device may generate a testing database by duplicating at least one of the one or more databases. The computing device may then predict an optimized virtual warehouse configuration for a first virtual warehouse by selecting a plurality of different warehouse configurations for the first virtual warehouse, measuring performance parameters of each of the plurality of different warehouse configurations by emulating, via the first virtual warehouse, the plurality of different events at the testing database, and selecting the optimized virtual warehouse configuration based on the performance parameters. The plurality of different warehouse configurations may each correspond to a different set of computing resources available to the first virtual warehouse. Then, the computing device may output the optimized virtual warehouse configuration.

As another example of how aspects described herein may be performed, a computing device may be configured to generate a testing database that corresponds to the state of one or more databases managed by a data sharing platform at a point in time. For example, the computing device may generate a zero-copy clone of the one or more databases. That data sharing platform, which may be the same as or similar to the Snowflake platform, may enable users to access one or more databases managed by the data sharing platform. The data sharing platform may be configured to provide access to the data stored by the data sharing platform via one or more of a plurality of virtual warehouses. Each of the plurality of virtual warehouses may comprise a respective set of computing resources configured to, e.g., execute one or more queries with respect to at least a portion of a plurality of data warehouses, collect results from the one or more queries, and provide access to the collected results. The computing device may determine a log of a plurality of different events executed, via one or more of the plurality of virtual warehouses and after the point in time, with respect to the one or more databases. For example, to log the plurality of different events, the computing device may log one or more queries executed with respect to the one or more databases. The computing device may then predict an optimized virtual warehouse configuration for a first virtual warehouse. As part of that prediction process, the computing device may measure first performance parameters of a first warehouse configuration by replaying, via the first virtual warehouse, the plurality of different events at the testing database while the first virtual warehouse is configured in accordance with the first warehouse configuration. The plurality of different warehouse configurations may each correspond to a different set of computing resources available to the first virtual warehouse. The computing device may then modify the testing database by rolling the testing database back to the state of the one or more databases managed by the data sharing platform at the point in time. Then, the computing device may measure second performance parameters of a second warehouse configuration by replaying, via the first virtual warehouse, the plurality of different events at the testing database while the first virtual warehouse is configured in accordance with the second warehouse configuration. Then, the computing device may select the optimized virtual warehouse configuration based on the first performance parameters and the second performance parameters. The computing device may then output the optimized virtual warehouse configuration.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
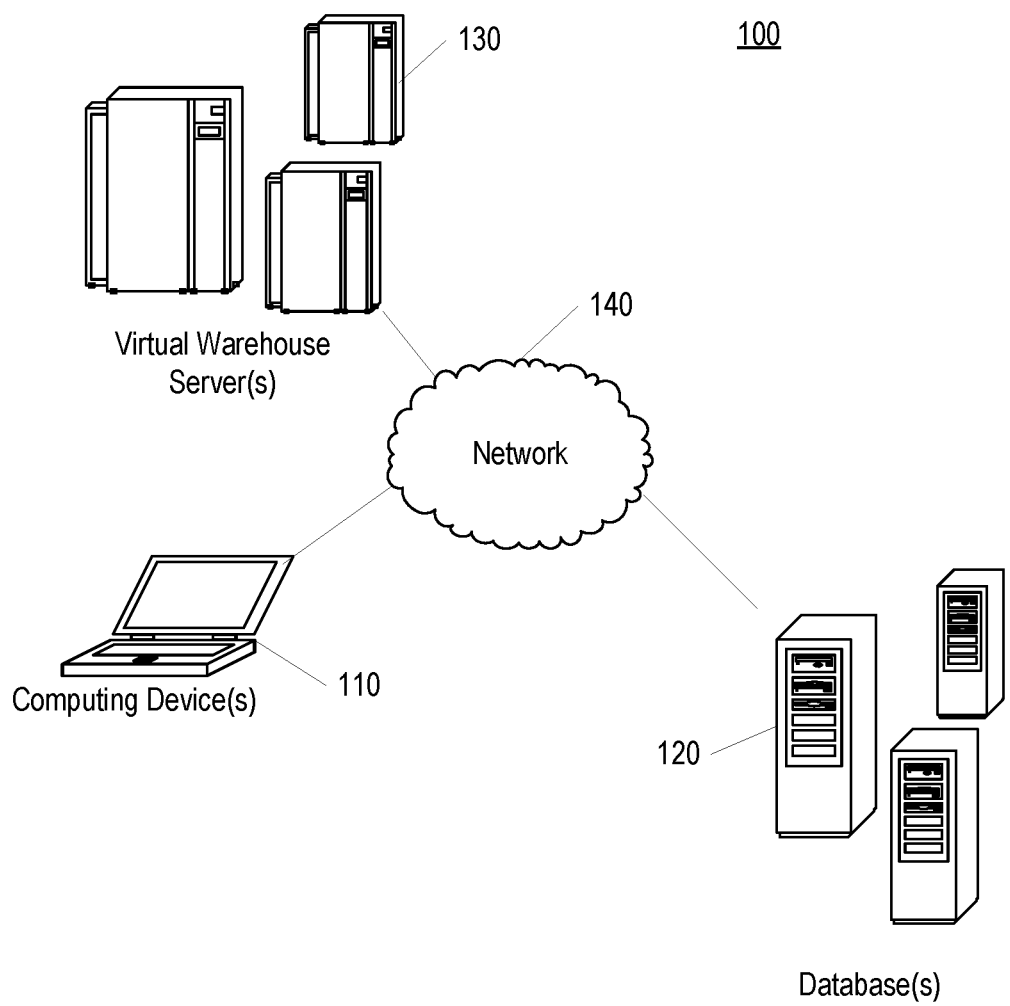
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for management of virtual warehouses which execute queries with respect to one or more data warehouses. A virtual warehouse may comprise one or more computing devices which are configured to perform tasks associated with one or more queries, such as executing the one or more queries with respect to one or more data warehouses, collecting results from those one or more queries (e.g., from the one or more data warehouses), and/or providing those collected results to one or more user devices. For example, three virtual warehouses may be instantiated on a single computing device (e.g., a server), a plurality of computing devices (e.g., a distributed network of servers), or the like. The availability of and/or use of a virtual warehouse may be associated with cost. For example, an organization may be charged based on a time in which a virtual warehouse is used, the size of a query, the amount of memory used by a query, or the like. Accordingly, virtual warehouses may be limited in their size (that is, the amount of computing resources available to them) to save money and to preserve computing resources. For example, for simple queries, a virtual warehouse may be instantiated with a relatively small quantity of computing resources (e.g., processor speed, memory) so as to lower the cost of maintaining and using that virtual warehouse. Moreover, multiple virtual warehouses may be available to an organization. For example, an organization may maintain a large virtual warehouse for significant and business-critical queries, whereas it may maintain a plurality of smaller virtual warehouses for more routine and less time-sensitive queries.

Methods, systems, apparatuses, and computer-readable media as described herein may relate to the analysis of how computing resources may be efficiently allocated to virtual warehouses in view of real-life events occurring with pre-existing virtual warehouses. A log of events associated with virtual warehouses (e.g., queries provided to those virtual warehouses, sorting and/or viewing activities with respect to those virtual warehouses) may be retrieved. A duplicate copy of one or more databases may be made. Then, the events may be emulated with respect to the duplicate copy of the one or more databases using a virtual warehouse, such that various configurations of that virtual warehouse may be tested. During such testing, performance parameters may be collected. Then, an optimized virtual warehouse configuration may be selected based on the performance parameters. In this manner, configurations for a virtual warehouse may be tested using real-world queries and real-world data, providing realistic performance parameters that help accurately estimate the impact of a particular virtual warehouse configuration.

The present disclosure is significantly different than conventional optimization processes at least in that it operates in view of the particularities and unique needs of virtual warehouses. The present disclosure is far more than a mere instruction to decide the optimal size of a data warehouse: rather, the present disclosure processes and emulates a large quantity of real-world events against a duplicative database to generate test data that is, by virtue of the manner in which it is emulated, unique to the circumstance where such events are implemented through virtual warehouses. This complexity is one reason why many users of virtual warehouse as a service platforms, such as the Snowflake platform, may inadvertently overspend for excessive computing resource allocations: because they do not have the tools for accurately testing the effectiveness of a particular virtual warehouse configuration, and because the particularities of virtual warehouse as a server platforms (e.g., the Snowflake platform) introduce complexities which effectively moot conventional database sizing considerations, they have no insight into the ramifications of changing such a configuration.

The present disclosure also improves the functioning of computers by improving the manner in which queries are executed with respect to one or more data warehouses. Virtual warehouses provide an improvement to conventional query systems, but their misconfiguration and misuse can result in the waste of computing resources. As such, improvements to the manner in which queries are received by virtual warehouses may make those virtual warehouses more efficient. For example, by properly sizing a virtual warehouse based on testing various virtual warehouse configurations using real-world data and past events that have occurred with respect to that real-world data, the virtual warehouse can be configured in a manner which, e.g., does not unnecessarily waste computing resources and which does not cause queries to take an undesirably long time to execute.

The present disclosure is also fundamentally rooted in computing devices and, in particular, an environment with virtual warehouses. Presently, virtual warehouse as a service platform architectures (e.g., Snowflake's architecture) are unique in that they allow for different configurations for different compute environments (e.g., different virtual warehouses). In contrast, other database systems rely on monolithic systems to handle all enterprise needs. It is precisely this flexibility of these virtual warehouse as a service platforms that is addressed by the improvements discussed herein.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 may be located in a first location (e.g., the offices of a corporation), and the virtual warehouse servers 130 and/or the data warehouses 120 may be located in a variety of locations (e.g., distributed in a redundant manner across the globe). This may protect business resources: for example, if the Internet goes down in a first location, the distribution and redundancy of various devices may allow a business to continue operating despite the outage.

The virtual warehouse servers 130 may be all or portions of a virtual warehouse as a service system. One example of such a virtual warehouse as a service system is the Snowflake architecture. With that said, any type of virtual warehouse as a service system may be implemented using the present disclosure. For example, the computing devices 110 and/or the data warehouses 120 may be managed by an organization. In contrast, the virtual warehouse servers 130 may be managed by a different entity, such as Snowflake Inc. In this manner, a third party (e.g., Snowflake) may provide, as a service, virtual warehouses which may operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse may be a single database, a collection of databases, or the like. A data warehouse may be structured and/or unstructured, such that, for example, a data warehouse may comprise a data lake. A data warehouse may store data in a variety of formats and in a variety of manners. For example, a data warehouse may comprise textual data in a table, image data as stored in various file system folders, and the like.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
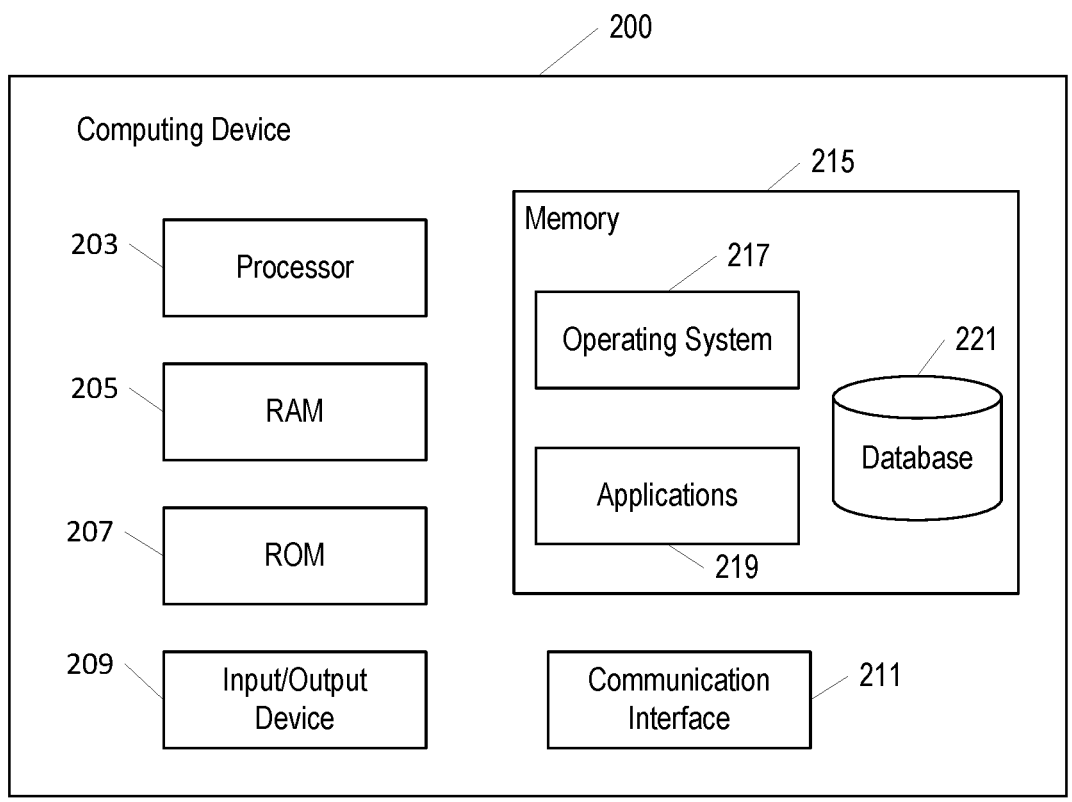
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
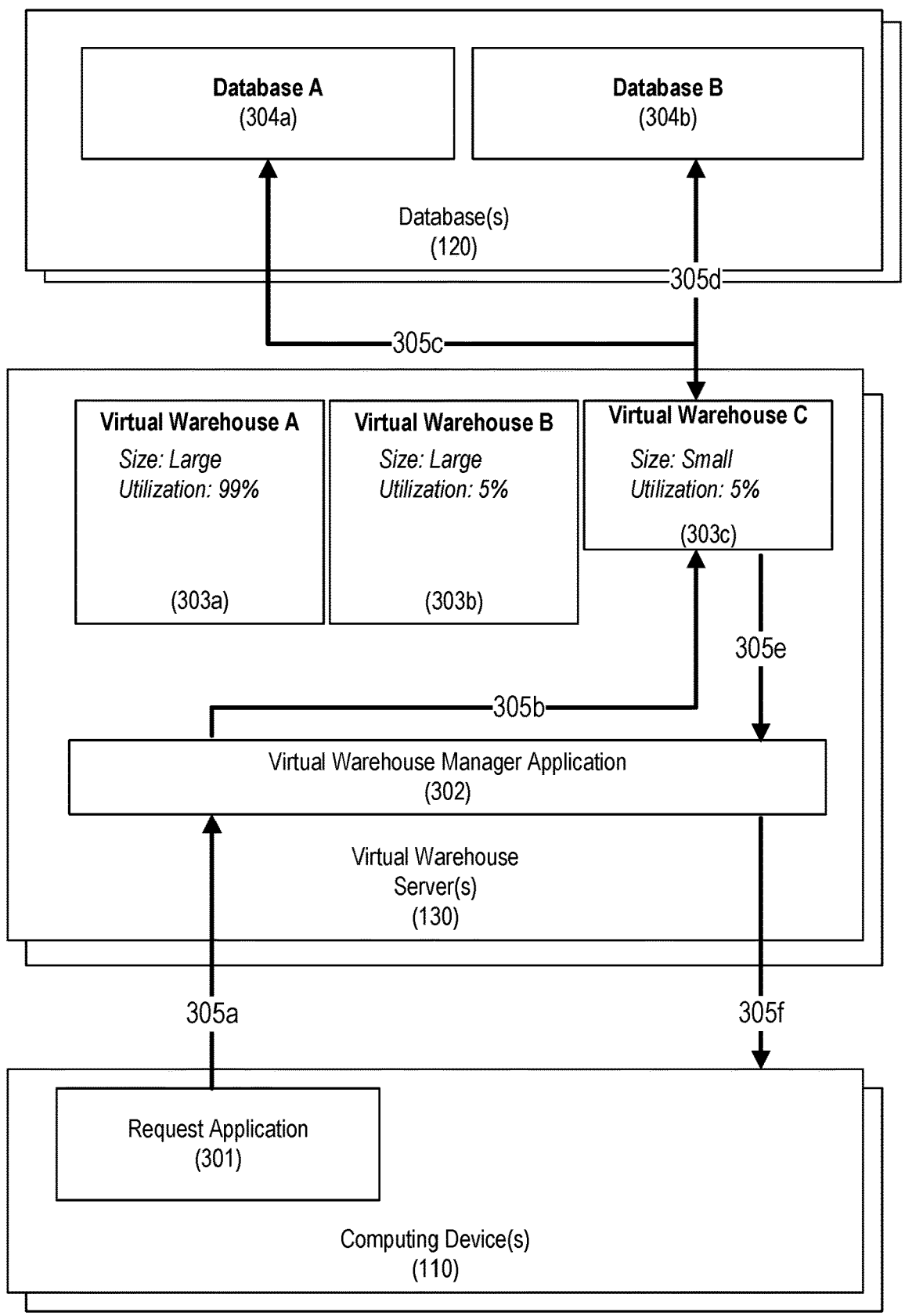
FIG. 3 depicts computing devices, virtual warehouse servers, and data warehouses working in conjunction to execute queries.

FIG. 3 shows a system comprising the computing devices 110, the virtual warehouse servers 130, and the data warehouses 120 of FIG. 1. FIG. 3 may depict all or portions of a system configured according to the Snowflake architecture or a similar architecture permitting use of one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by a virtual warehouse as a service platform organization, such as Snowflake Inc., of San Mateo, CA.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Broadly, such quantities of computing resources may be referred to via "t-shirt sizes," such that one virtual warehouse may be referred to as "large," whereas another may be referred to as "small." Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to execute queries, collect results, and provide those results.

Virtual warehouses, such as the virtual warehouse A 303a, the virtual warehouse B 303b, and/or the virtual warehouse C 303c, may be resized based on a schedule. For example, a single virtual warehouse (e.g., the virtual warehouse A 303a) may be resized based on a schedule specific to that virtual warehouse (and/or a group of virtual warehouses) such that it is larger during business hours (e.g., 9:00 AM to 5:00 PM) as compared to other hours. Such a schedule may be defined by an administrator, may be based on a use pattern specific to the virtual warehouse, and/or may be based on a pattern of activity, by one or more users, corresponding to one or more different virtual warehouses. For example, the virtual warehouse manager application 302 may monitor use of virtual warehouses and determine that, during business hours, the virtual warehouses are used more frequently. Based on such a determination, the virtual warehouse manager application 302 may configure one or more virtual warehouses with a schedule that causes those one or more virtual warehouses to be larger during business hours and smaller during non-business hours. This may advantageously save money for an organization: by dynamically scaling the size of virtual warehouses, needlessly large (and thereby needlessly expensive) virtual warehouses need not be maintained.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304b, need not be the same: for example, the data warehouse A 304a may have an entirely different format, may have entirely different schedules which affect their size at any given time, and may have an entirely different structure as compared to the data warehouse B 304b. For instance, the data warehouse A 304a may comprise a SQL database, whereas the data warehouse B 304b may comprise a file server which stores files according to the File Allocation Table (FAT) file system. As part of this process, the virtual warehouse C 303c may receive, store, and/or organize results from the data warehouses 120. For example, the virtual warehouse C 303c may receive query results from the data warehouse A 304a and the data warehouse B 304b, may store those results in memory, and then may encrypt those results for security purposes.

As part of step 305e, the virtual warehouse C 303c provides the collected results to the virtual warehouse manager application 302. Then, as part of step 305f, the virtual warehouse manager application 302 provides the results to one or more of the computing devices 110. This process is optional, as the virtual warehouse C 303c may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305a is reflected as an arrow directly leading from the request application 301 to one or more of the virtual warehouse servers 130, the request may in fact be routed through various other computing devices as part of the network 140. As another example, the query process reflected in step 305c and step 305d may involve a plurality of different transmissions between the virtual warehouse C 303c and the data warehouses 120.

Discussion will now turn to steps which may be performed from the perspective of a computing device executing the virtual warehouse manager application 302.

Figure 4:
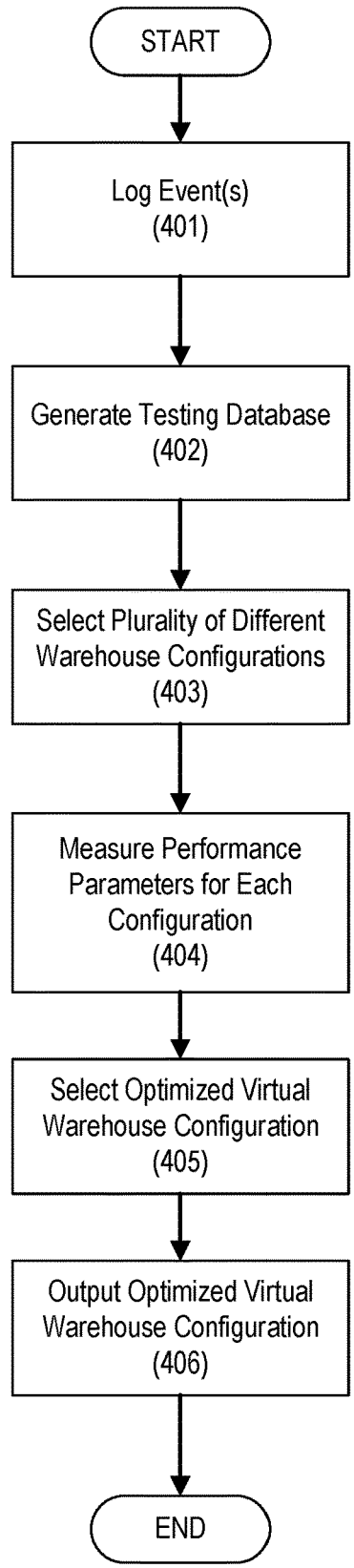
FIG. 4 shows a flow chart which may be performed to determine an optimized virtual warehouse configuration.

FIG. 4 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device external to a preexisting virtual warehouse environment.

In step 401, the computing device may log events. For example, the computing device may log a plurality of different events associated with a data sharing platform, such as Snowflake. An event may comprise any activity associated with one or more databases, virtual warehouses, or the like. One example of an event may be a write action to a database of one or more databases. Another example of an event may be a read action to a database of one or more databases. As such, the logged events may represent one or more actions that have been taken with respect to one or more virtual warehouses and/or one or more databases, such as queries, requests to view content, or the like.

In some instances, step 401 may comprise the computing device receiving a preexisting log of events. In some virtual warehouse platform (e.g., Snowflake) implementations, a log may be maintained of one or more events that have occurred with respect to one or more virtual warehouses and/or one or more databases. In such a circumstance, the computing device may receive (e.g., retrieve) this log, rather than generating it.

Events may be associated with different sizes. For example, one query may be considered large in that it requires a relatively large quantity of computing resources to complete, whereas another query may be considered small in that it requires a relatively smaller quantity of computing resources to complete. The size of an event may implicate how long it takes for a virtual warehouse to complete the event. For example, a large sized query may be executed quickly on a large virtual warehouse, whereas a small virtual warehouse may take quite a long time to complete the large sized query. A user need not specify the size of a query; rather, the size of the query itself may be determined based on an execution plan associated with the query. For example, as indicated above, an execution time may be predicted based on an execution plan corresponding to a query. As such, the particular size of a query may correlate to the predicted execution time of a query: for example, a query requiring less than one second may be considered small, whereas any query over one minute may be considered large.

In turn, a plurality of events may comprise events of a variety of different sizes. For example, the log determined in step 401 may comprise a first event that satisfies a processing time threshold (e.g., and is considered "large"), whereas the log may also comprise a second event that does not satisfy the processing time threshold (and, e.g., is not considered "large"). In this manner, the plurality of events may comprise a wide variety of different types of events, thus better representing the real variety of events which may occur with respect to a real-world virtual warehouse. This is but one example of an advantage of the present disclosure over other systems: by using real-world events, a wide variety of such events can be collected (and, later, emulated), thus providing significantly more robust and accurate simulation data.

As one example of how events may be divided into different sizes, queries may be added to a group of small queries if the queries took less than a minute to execute on a virtual warehouse. Queries may be added to a group of medium queries if the queries took between one and five minutes to execute on a virtual warehouse. Queries may be added to a group of large queries if the queries took over five minutes to execute.

The log may correspond to a particular time period. For example, a log of a plurality of events may correspond to workdays, the workweek, or the like. The log may be segregated and/or otherwise arranged based on time, such that, e.g., events may be categorized based on time of day (e.g., during the workday, outside of working hours), based on day of the week (e.g., weekdays versus weekends), or the like. Such information may be advantageously used to emulate different times, such that, e.g., the computing device may emulate both workday conditions and weekend conditions. Such information may be advantageous to determine whether, for example, a virtual warehouse should be resized during certain hours (e.g., the evening).

One manner in which the log may be retrieved is through a query history functionality, such as the Query History functionality of the Snowflake architecture. Query history functionalities can store information about previously-executed queries. For example, the Query History functionality of the Snowflake platform stores detailed information about any query that has been executed in a Snowflake system over a time period (e.g., one year). Each query is assigned a unique query identifier. In turn, each query can be uniquely identified and, as will be described in more detail below, emulated.

In step 402, the computing device may generate a testing database. For example, the computing device may generate a testing database by duplicating at least one of the one or more databases. This process may comprise generating a zero-copy form of a database at a particular time. For example, the testing database may be a copy of a database at a particular time corresponding to immediately before the events in the log of step 401 began. In this manner, the events from the log of step 401 may be re-run on the testing database to produce the current version of a database.

As will be discussed in greater detail below with respect to FIG. 7, the computing device may generate one or more testing databases in a manner which copies the state of one or more databases at a particular point in time. For example, the computing device may generate a testing database in a manner which causes the testing database to represent the state of a particular database at a particular point in time before the events logged in step 401. In this manner, the computing device may generate a testing database that reflects the state of a database before the events logged in step 401 were logged, such that one or more of those events may be replayed with respect to the database. To perform this process, a time travel functionality (such as the Snowflake time travel functionality), which enables accessing of historical data at any point within a defined period, may be used.

With that said, the testing database need not always reflect the database at a point in time before the events logged in step 401. For example, the testing database may reflect a latest form of the database, such that older queries are executed against the current form of the database. In this manner, changes to the database (e.g., a recent significant growth in size and/or complexity) may be accounted for via the testing database. In such a circumstance, the events may be filtered and/or otherwise adjusted such that they may be performed against the testing database without causing inconsistencies to emerge. For example, if an event logged in step 401 indicates that a user changed a particular cell (e.g., cell 03215) to a particular value (e.g., "Red"), then the testing database may already reflect that change. In that circumstance, the computing device may modify the event (e.g., to instead change the cell to a different value, such as "Black" or "Blue"), the computing device may may remove the event from the log, and/or the computing device may allow the event to remain in the log (e.g., such that the value "Red" is changed to "Red," though doing so would ordinarily be a waste of computing resources).

One way the testing database may be generated is by copying all or portions of an existing portion of a virtual warehouse environment. For example, the testing database may be a copy of an existing database in a virtual warehouse environment. Additionally and/or alternatively, the texting database may be generated using a zero-copy functionality, such as the zero-copy functionality of the Snowflake platform. Snowflake's zero-copy cloning feature, for instance, may take a snapshot of any table, schema, or database and creates a derived copy of that object which initially shares the underlying storage. This functionality may be useful for creating instant backups that might not incur any particular storage costs in a virtual warehouse architecture. In other words, this process may allow for the creation of a backup that does not require that data be copied from one storage device or another. For example, when a zero-copy clone of a database is created, the clone might not use data storage because it shares all of the existing micro-partitions of the original table at the time it was closed. That said, as rows are added/deleted/updated in the clone (and independently from the original table), new micro-partitions may be created that are associated with the clone (and not the original database). In this manner, the original data may be preserved even when the testing database is modified during testing.

The testing database may be a copy of the database with which the events from the log in step 401 were performed. For example, if the events in the log received in step 401 are with respect to a particular database, then the testing database may be a copy of that particular database. In this manner, the same events may be emulated against the same data.

In step 403, the computing device may select a plurality of different virtual warehouse configurations. For example, the computing device may select a plurality of different virtual warehouse configurations for the first virtual warehouse. Each of the plurality of different warehouse configurations may correspond to a different set of computing resources available to the first virtual warehouse. For example, one virtual warehouse configuration may have a different quantity of memory as compared to another configuration. As another example, one virtual warehouse configuration may have a different processor speed than another configuration. As indicated above, such configurations may be referred to in terms of t-shirt sizes. For example, one virtual warehouse configuration may be referred to as "large" if it has at least a first amount of memory, whereas a virtual warehouse may be referred to as "small" if it has less than or equal to a second amount of memory. In some instances, each respective size may be double the number of computing resources (e.g., nodes) as a previous size. For example, a "large" size may be double the size of a "medium" size.

Different virtual warehouse configurations may correspond to different numbers of nodes and/or clusters in use. Broadly, a virtual warehouse may be multi-cluster in that they may use multiple sets of computing resources. Additionally and/or alternatively, a virtual warehouse may be multi-node in that it may entail use of multiple nodes. As such, for example, one "extra small" virtual warehouse may comprise a single node, whereas a "large" virtual warehouse may comprise eight nodes. As such, one virtual warehouse configuration may indicate that a virtual warehouse is to comprise only one node and/or one cluster, whereas another virtual warehouse configuration may indicate that a virtual warehouse can comprise up to a certain number of nodes and/or clusters.

Different virtual warehouse configurations may correspond to different scaling policies. Different virtual warehouses may scale to different sizes (e.g., quantity of computing resources, quantity of clusters, quantity of nodes) at different times. For example, one virtual warehouse configuration may cause a virtual warehouse to scale down its number of computing resources at night, whereas another virtual warehouse configuration may cause a virtual warehouse to dynamically add or remove clusters and/or nodes based on its workload.

Different virtual warehouse configurations may correspond to different auto suspend policies. Virtual warehouses need not be available at all times, and some virtual warehouses may be disabled during certain periods of time and/or based on utilization. For example, a virtual warehouse configuration may cause a virtual warehouse to automatically suspend itself (and thereby preserve computing resources and money) when it has not been used for over an hour. As another example, a virtual warehouse configuration may cause a virtual warehouse to automatically suspend itself at night.

Different virtual warehouse configurations may correspond to different durations of time. For example, certain virtual warehouses may be instantiated for different periods of time (e.g., one hour, one day, one week). For example, one virtual warehouse configuration may indicate that a virtual warehouse should be available for only an hour, whereas another virtual warehouse configuration may indicate that a virtual warehouse should be available for only a week.

In step 404, the computing device may measure performance parameters for each of the plurality of different warehouse configurations by, e.g., emulating the logged events from step 401. For example, the computing device may measure performance parameters of each of the plurality of different warehouse configurations by emulating, via the first virtual warehouse, the plurality of different events at the testing database. Such performance parameters may comprise, for example, the execution time of a particular event (e.g., as recorded by the EXECUTION TIME field of the Snowflake architecture). An example of such performance parameters is provided as FIG. 6, which is discussed in further detail below.

As an example of how the plurality of different events may be emulated, the computing device may first select, from the plurality of different warehouse configurations, a particular virtual warehouse configuration. The computing device may then configure (e.g., instantiate) a first virtual warehouse based on the particular virtual warehouse configuration. Then, the computing device may cause the plurality of different events to be executed with respect to the first virtual warehouse. The computing device need not provide all of the plurality of different events to the first virtual warehouse at once: after all, doing so may easily overwhelm even the largest virtual warehouse, particularly if the plurality of different events is particularly voluminous. Instead, the computing device may, e.g., emulate real activity by causing the plurality of different events to be executed with respect to the first virtual warehouse across a time period. For example, the computing device may insert random delays between the initiation of each of the plurality of different events, thereby emulating the potentially random nature of the plurality of different events. After all, it may be largely unpredictable as to when certain events may initiate in real life.

As such, emulation of the plurality of different events may comprise causing each of the plurality of different events to be initiated at a different time. For example, a first event may be started at 10:01, whereas a second event may be started at 10:04. As some events may be scheduled at particular times, the emulation of the plurality of different events may take into account that certain events may be initiated at those particular times. For example, if a particular event is initiated every two minutes, then the particular event may be emulated such that it repeats every two minutes. As another example, if a particular event only occurs at a particular wall clock time (e.g., midnight), then the particular event may be emulated along with other events that were logged at or around midnight.

Events may be randomly selected during emulation. For example, to emulate the unpredictability of events at a virtual warehouse, the computing device may randomly select ten different events from the log in step 401. These events may then be randomly executed in a non-sequential manner by adding a randomized wait time between the initiation of each event.

The performance parameters measured as part of step 404 may indicate one or more processing times corresponding to each of the plurality of different events. For example, the performance parameters may indicate, for each emulated event of the emulated plurality of different events, a quantity of time taken by a virtual warehouse to complete the emulated event. Such values may be collected (e.g., averaged) based on the size of the event in question. For example, the performance parameters may indicate, for example, that a large virtual warehouse took ten seconds on average to complete large queries, five seconds on average to complete medium queries, and one second on average to complete small queries. Those performance parameters may also indicate, for example, that a small virtual warehouse took twenty minutes on average to complete large queries, one minute on average to complete medium queries, and thirty seconds on average to complete small queries.

As one example of how performance parameters may be collected, performance parameters may be collected for each query emulated as part of step 404. To implement such a functionality, performance parameters may be correlated with unique query identifiers (e.g., the query identifiers assigned to queries in the Snowflake Query History functionality).

One way in which performance parameters may be measured is a quantity of events that changed size. The size of a virtual warehouse may change the speed with which a particular event is completed by the virtual warehouse. In turn, based on the size of a virtual warehouse, a size of an event (that is, the processing time required for a particular event) may change. For example, a small virtual warehouse may take fifteen minutes to perform a particular query, meaning that the query may in that circumstance belong to a group of large queries. That said, a large virtual warehouse may take less than a minute to perform the same query, meaning that the same query may in that circumstance belong to a group of small queries. This shift from a large query to a small query may be a useful indicator of the value of increasing the size of a virtual warehouse form small to large.

In step 405, the computing device may select an optimized virtual warehouse configuration. This selection may be based on the performance parameters measured in step 404. The computing device need not select the virtual warehouse that performs the most quickly or efficiently. Rather, the selection of the optimized virtual warehouse configuration may be based on a balance between the increasing cost of the size of a virtual warehouse as compared to the incremental value such size provides in processing speed.

The selection of the optimized virtual warehouse configuration may be based on the intended use of the virtual warehouse. In some circumstances, events (e.g., queries) may be so time sensitive that the speed of the queries may be worth paying significant sums. In such a circumstance, even if a larger virtual warehouse is extremely expensive, paying for such a virtual warehouse may be worthwhile to ensure that queries are speedily processed. On the other hand, even if time is of a concern, if a small virtual warehouse is approximately equally speedy, then using such a small virtual warehouse may be tolerable.

To provide an example of step 405, the performance parameters may indicate that a large virtual warehouse takes one minute on average to process large queries, whereas a small virtual warehouse takes fifteen minutes on average to process the same queries. The cost difference between the large virtual warehouse and the small virtual warehouse may be, for example, fifty thousand dollars a month. In such a circumstance, it may be optimal for the virtual warehouse to be small if, for example, the virtual warehouse is to be used occasionally and/or by a department of an organization that does not require their queries to be answered particularly quickly. In other words, the incremental value of the fourteen minutes saved might not be worth the fifty thousand dollar a month cost. On the other hand, if the virtual warehouse is to be used by a particularly time-sensitive department of an organization, then the incremental value of the fourteen minutes saved may be entirely worth the fifty thousand dollar a month additional cost.

The process depicted in step 403 through 405 may entail use of a machine learning model. An example of a neural network architecture via which such machine learning models may be implemented is provided as FIG. 5, which is discussed below. Machine learning models may be trained to aid in the selection of an optimized virtual warehouse configuration such that, for example, wider varieties of data may be taken into account when recommending a particular virtual warehouse configuration. The computing device may train, using training data, a machine learning model to output a recommended virtual warehouse configuration. That training data may comprise a history of different virtual warehouse configurations and a history of different event processing times. In other words, the training data need not be specific to certain data, but may reflect a broad set of event processing times across a variety of different virtual warehouse configurations and/or a variety of different databases. The computing device may then provide, to the trained machine learning model, input comprising the performance parameters determined in step 404. The computing device may then receive, from the trained machine learning model, output indicating the optimized virtual warehouse configuration. In this manner, the machine learning model may recommend an optimized virtual warehouse configuration based on both historical processing times (as reflected in the training data) and the performance parameters (e.g., that are specific to a particular set of data).

In step 406, the computing device may output the optimized virtual warehouse configuration. The output may be in a user interface. For example, the output may comprise a user interface element which prompts a user to accept the optimized virtual warehouse configuration. In such a circumstance, upon user acceptance (by, e.g., selecting a button), one or more existing virtual warehouses may be automatically resized based on the optimized virtual warehouse configuration.

Figure 5:
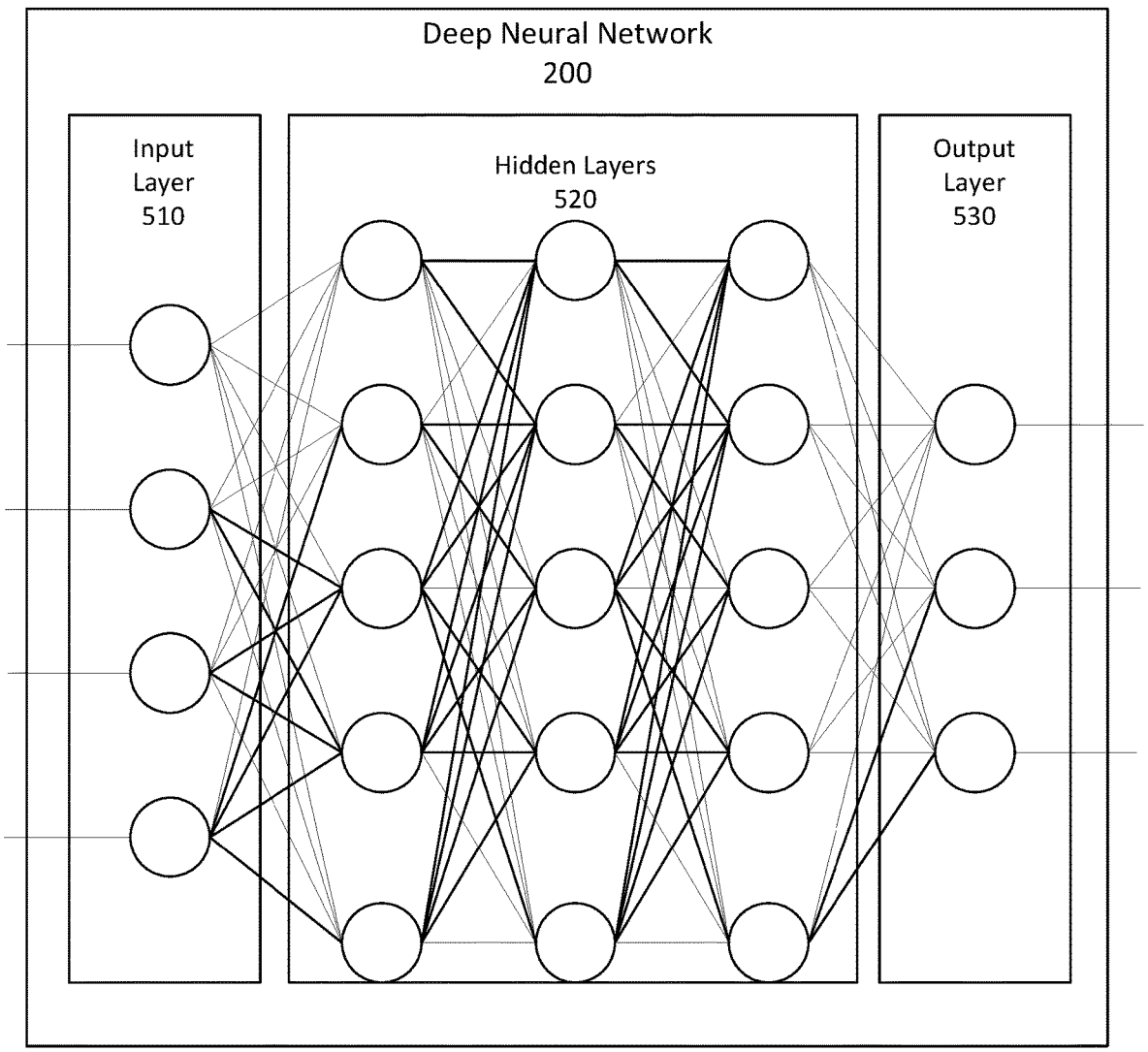
FIG. 5 depicts an example deep neural network architecture for a model according to one or more aspects of the disclosure.

FIG. 5 depicts an example deep neural network architecture 500. The architecture depicted in FIG. 5 need not be performed on a single computing device, and may be performed by, e.g., a plurality of computers (e.g., any one of the devices depicted in FIG. 1). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 510, one or more hidden layers 520, and an output layer 530. A deep neural network, as used herein, may be an artificial network that has more than one hidden layer. Illustrated network architecture 500 is depicted with three hidden layers, and thus may be considered a deep neural network. The number of hidden layers employed in deep neural network 500 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 6:
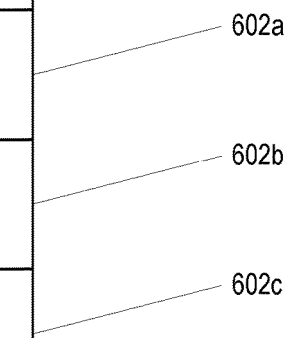
FIG. 6 depicts an example of performance parameters from which an optimized virtual warehouse configuration may be selected.

FIG. 6 depicts an example of performance parameters 600 via which an optimized virtual warehouse configuration may be selected. The performance parameters 600 depicted in FIG. 6 may be, for example, the same or similar as the performance parameters discussed with respect to step 404 of FIG. 4.

The performance parameters 600 are depicted as a table with four columns: a virtual warehouse configuration column 601a, an average large event speed column 601b, an average medium event speed column 601c, an average small event speed 601d, and a cost column 60. These columns are illustrative, and represent one way in which performance parameters might be collected. For example, in some instances, each separate event might be measured, such that averages (such as those depicted in step FIG. 6) need not be collected.

The first data row 602a indicates that a large virtual warehouse configuration costing $30,000 a month completed large events after an average of seven seconds, medium events after an average of two seconds, and small events in less than one second. The second data row 602b indicates that a medium virtual warehouse configuration costing $5,000 a month completed large events after an average of fifty-eight seconds, medium events after an average of ten seconds, and small events after an average of five seconds. The third data row 602c indicates that a small virtual warehouse configuration costing $1,000 a month completed large events after an average of five minutes, medium events after an average of one minute, and small events after an average of fifty seconds.

The performance parameters 600 shown in FIG. 6 illustrate a simplified form of the type of analysis which may be performed to select an optimized virtual warehouse configuration. In this example, the large virtual warehouse configuration is quite costly, but might also guarantee the speedy handling of large events (e.g., large queries). In some circumstances (e.g., time-sensitive business situations), the cost of the large virtual warehouse configuration might be worthwhile. On the other hand, if events (e.g., queries) are not high priority, then it may be more cost-effective to use the medium and/or small virtual warehouse configuration. In practice, this analysis may be significantly more complicated: for example, one virtual warehouse configuration might entail setting a virtual warehouse to be large during certain times of day when large and time-sensitive queries are expected, but small otherwise. Indeed, in practice, the performance parameters 600 might be hundreds of different rows which reflect a variety of different possible combinations of virtual warehouse configurations (e.g., virtual warehouse size, number of clusters and/or nodes in use at any given time, scaling policies, auto suspend policies, duration(s) of time with which the virtual warehouse is available, etc.).

Discussion will now turn to a manner in which an optimized virtual warehouse configuration may be determined by replaying events on a past version of a database. In particular, as will be discussed below, a snapshot of one or more databases may be captured, and events logged after that snapshot may be replayed in a variety of different configurations. Such a testing approach may be taken where, for example, the size and/or complexity of the database remains substantially the same over time, such that testing of an older form of a database might indicate appropriate configurations for virtual warehouses implementing queries on future forms of that same database. Advantageously, such an approach may allow for testing to be more accurate in certain circumstances: because the events logged are replayed against the same database in the same state (and can be replayed in what amounts to a time-shifted manner), realistic performance parameters may be measured.

Figure 7:
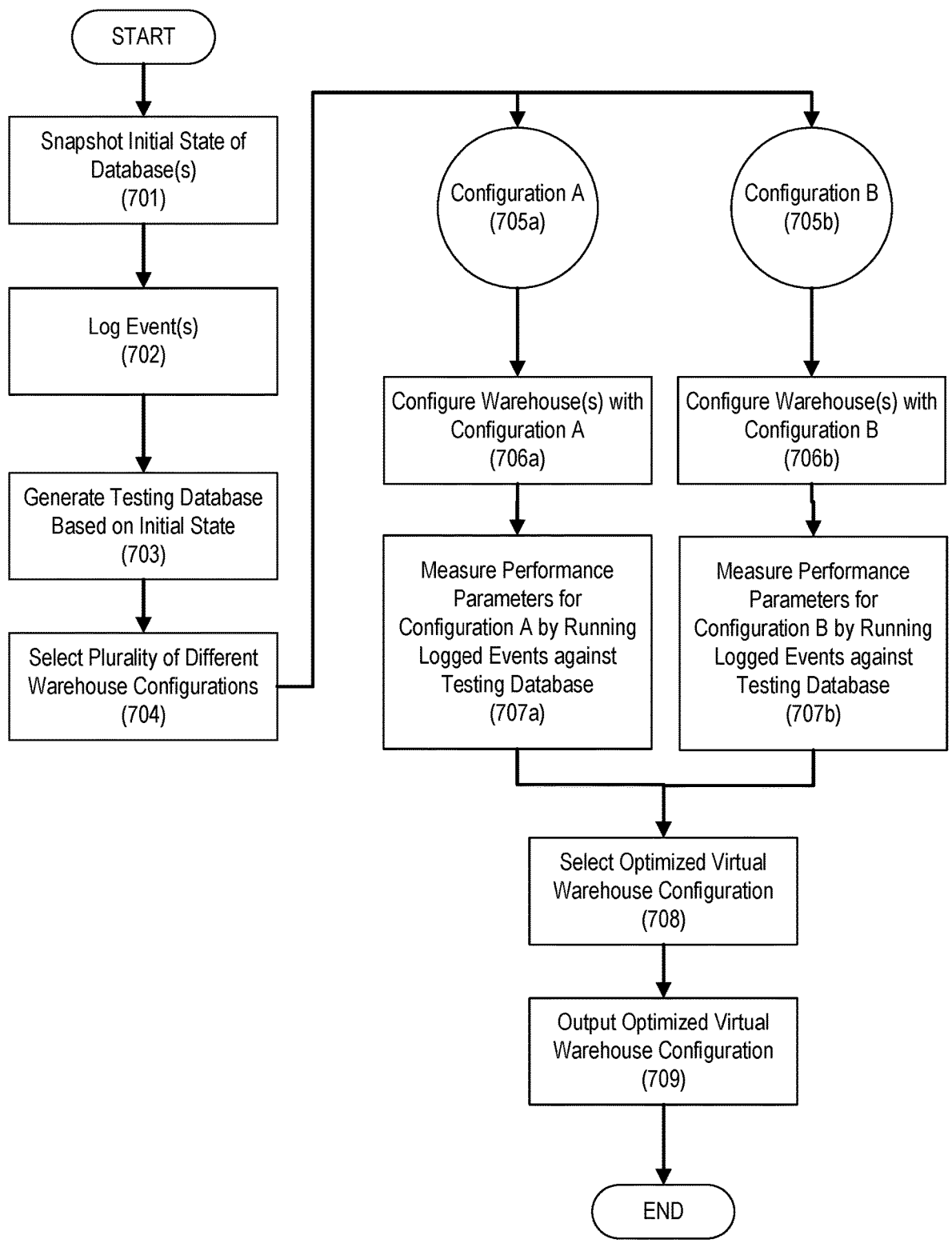
FIG. 7 shows a flow chart which may be performed to determine an optimized virtual warehouse configuration.

FIG. 7 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 7. The steps depicted in FIG. 7 may operate on a Snowflake environment or other virtual warehouse environment, such that they may be performed by a computing device within or external to such an environment. For example, the steps depicted in FIG. 7 may be performed on a user device external to a preexisting virtual warehouse environment.

In step 701, the computing device may snapshot an initial state of one or more databases. This initial state may comprise an initial state of the data stored of the one or more databases at a particular point in time, such as a point in time before one or more events are logged. This snapshot may be taken by performing a copy (e.g., a zero copy) of the one or more databases, using the time travel functionality of Snowflake, or similar methods. For example, the computing device may generate the testing database by generating a zero-copy clone of the one or more databases. In this manner, the computing device may store a particular version of one or more databases at a particular point in time. For example, the computing device may generate, at a first time, a testing database that corresponds to the state of one or more databases managed by a data sharing platform at a point in time.

Because the time travel functionality of a virtual warehouse environment (e.g., Snowflake) may allow the retrieval of historical states of data, step 701 need not be performed before events are logged. For example, in some instances, various database states may be preserved over time, and various events may be logged over time. As such, it may be possible to simply select a particular state of a database at a particular point in time, then to retrieve all events performed with respect to that database after the particular point in time.

In step 702, the computing device may determine a log of one or more events. For example, the computing device may log the one or more events by logging one or more queries executed with respect to the one or more databases. This step may be the same or similar as step 401 of FIG. 4. For example, the computing device may determine a log of a plurality of different events executed, via one or more of the plurality of virtual warehouses and after a point in time (e.g., that corresponding to a snapshot of a database), with respect to the one or more databases. The logging in step 702 may be performed on a continual basis, such that it need not be performed after snapshot(s) of databases are captured, and/or need not end at any particular time. For example, this logging may comprise use of the Snowflake Query History functionality. In circumstances where the one or more events are continually logged, the events may be filtered and/or otherwise organized such that the logged events in step 702 comprise events that occurred after a time associated with the initial state of the databases snapshot in step 701.

In step 703, the computing device may generate a testing database based on the snapshot taken in step 701. This step may be the same or similar as step 402 of FIG. 4.

In step 704, the computing device may select a plurality of different warehouse configurations. In the example depicted in FIG. 7, two configurations (configuration A 705a and configuration B 705b) have been selected, and are depicted as branching paths. With that said, any number of configurations may be selected and tested. Indeed, hundreds of different possible configurations might be selected and tested. This step may be the same or similar as step 403 of FIG. 4.

Though FIG. 7 depicts the configuration A 705 and configuration B 705b as branching paths, this need not suggest that the steps in these branching paths be performed in parallel. Indeed, depending on various considerations (e.g., computing resource availability, speed requirements), the steps in each branching path might be performed sequentially, partially in parallel, entirely in parallel, or some combination thereof.

In step 706a, the computing device may configure the virtual warehouses with the configuration A 705a. Similarly, in step 706b, the computing device may configure the virtual warehouses with the configuration B 705b. For example, if the configuration A 705a entails use of five nodes and/or clusters, then step 706a may comprise configuring one or more virtual warehouses to use five nodes and/or clusters. As another example, if the configuration B 705b entails use of large-sized nodes and/or clusters, then step 706b may comprise configuring one or more virtual warehouses to use large-sized nodes and/or clusters.

In step 707a, the computing device may measure performance parameters for the configuration A 705a by running the events, logged in step 702, against the testing database generated in step 703. For example, the computing device may measure performance parameters of each of a plurality of different warehouse configurations by replaying, via the first virtual warehouse, the plurality of different events at the testing database. Similarly, in step 707b, the computing device may measure performance parameters for the configuration B 705b by running the events, logged in step 702, against the testing database generated in step 703. These steps may be the same or similar as step 404 of FIG. 4.

As part of the processes described above, the computing device may modify the testing database by rolling the testing database back to the state of the database to which it corresponds. For example, after performing step 707a, the computing device may roll back the testing database to its status prior to when step 707a was performed. In turn, this may allow step 707b to be performed against the same testing database.

In step 708, the computing device may select an optimized virtual warehouse configuration. This step may be the same or similar as step 405 of FIG. 4.

In step 709, the computing device may output the optimized virtual warehouse configuration. This step may be the same or similar as step 406 of FIG. 4.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
one or more processors; and
memory storing instructions that, when executed by the one or more processors, cause the computing device to:
generate a testing database that corresponds to a state of one or more databases managed by a data sharing platform at a point in time, wherein the data sharing platform enables users to access the one or more databases managed by the data sharing platform, wherein the data sharing platform is configured to provide access to the data stored by the data sharing platform via one or more of a plurality of virtual warehouses, wherein each of the plurality of virtual warehouses comprises a respective set of computing resources configured to:
execute one or more queries with respect to at least a portion of a plurality of data warehouses;
collect results from the one or more queries; and
provide access to the collected results;
determine a log of a plurality of different events executed, via one or more of the plurality of virtual warehouses and after the point in time, with respect to the one or more databases;
predict an optimized virtual warehouse configuration for a first virtual warehouse by:
identifying a first subset of the plurality of different events based on determining that the first subset of the plurality of different events were conducted during a first time period;
identifying a second subset of the plurality of different events based on determining that the second subset of the plurality of different events were conducted during a second time period;
measuring first performance parameters of a first warehouse configuration by replaying, via the first virtual warehouse, the first subset of the plurality of different events at the testing database while the first virtual warehouse is configured in accordance with the first warehouse configuration, wherein the plurality of different warehouse configurations each correspond to a different set of computing resources available to the first virtual warehouse, and wherein the replaying the first subset of the plurality of different events comprises replaying a same event of the first subset of the plurality of different events at least twice;
modifying the testing database by rolling the testing database back to the state of the one or more databases managed by the data sharing platform at the point in time;
measuring second performance parameters of a second warehouse configuration by replaying, via the first virtual warehouse, the second subset of the plurality of different events at the testing database while the first virtual warehouse is configured in accordance with the second warehouse configuration, wherein the replaying the second subset of the plurality of different events comprises inserting one or more random delays between the initiation of at least two of the second subset of the plurality of different events; and
selecting the optimized virtual warehouse configuration based on the first performance parameters and the second performance parameters; and
output the optimized virtual warehouse configuration.

2. The computing device of claim 1, wherein the instructions, when executed by the one or more processors, cause the computing device to generate the testing database by causing the computing device to generate a zero-copy clone of the one or more databases.

3. The computing device of claim 1, wherein the instructions, when executed by the one or more processors, cause the computing device to determine the log of the plurality of different events by causing the computing device to log one or more queries executed with respect to the one or more databases.

4. The computing device of claim 1, wherein the instructions, when executed by the one or more processors, cause the computing device to replay the plurality of different events at the testing database by causing the computing device to:
cause each of the plurality of different events to be initiated via the first virtual warehouse at a different time.

5. The computing device of claim 1, wherein the plurality of different events comprise one or more of:
a write action to a database of the one or more databases; or
a read action to the database of the one or more databases.

6. The computing device of claim 1, wherein the instructions, when executed by the one or more processors, cause the computing device to predict the optimized virtual warehouse configuration by further causing the computing device to:
train, using training data, a machine learning model to output a recommended virtual warehouse configuration, wherein the training data comprises a history of different virtual warehouse configurations and a history of different event processing times;
provide, to the trained machine learning model, input comprising the first performance parameters and the second performance parameters; and
receive, from the trained machine learning model, output indicating the optimized virtual warehouse configuration.

7. The computing device of claim 1, wherein the first performance parameters indicate a processing time corresponding to each of the plurality of different events.

8. A method comprising:
generating a testing database that corresponds to a state of one or more databases managed by a data sharing platform at a point in time, wherein the data sharing platform enables users to access the one or more databases managed by the data sharing platform, wherein the data sharing platform is configured to provide access to the data stored by the data sharing platform via one or more of a plurality of virtual warehouses, wherein each of the plurality of virtual warehouses comprises a respective set of computing resources configured to:
execute one or more queries with respect to at least a portion of a plurality of data warehouses;
collect results from the one or more queries; and
provide access to the collected results;

determine a log of a plurality of different events executed, via one or more of the plurality of virtual warehouses and after the point in time, with respect to the one or more databases;
predicting an optimized virtual warehouse configuration for a first virtual warehouse by:
identifying a first subset of the plurality of different events based on determining that the first subset of the plurality of different events were conducted during a first time period;
identifying a second subset of the plurality of different events based on determining that the second subset of the plurality of different events were conducted during a second time period;
measuring first performance parameters of a first warehouse configuration by replaying, via the first virtual warehouse, the first subset of the plurality of different events at the testing database while the first virtual warehouse is configured in accordance with the first warehouse configuration, wherein the plurality of different warehouse configurations each correspond to a different set of computing resources available to the first virtual warehouse, and wherein the replaying the first subset of the plurality of different events comprises replaying a same event of the first subset of the plurality of different events at least twice;
modifying the testing database by rolling the testing database back to the state of the one or more databases managed by the data sharing platform at the point in time;
measuring second performance parameters of a second warehouse configuration by replaying, via the first virtual warehouse, the second subset of the plurality of different events at the testing database while the first virtual warehouse is configured in accordance with the second warehouse configuration, wherein the replaying the second subset of the plurality of different events comprises inserting one or more random delays between the initiation of at least two of the second subset of the plurality of different events; and
selecting the optimized virtual warehouse configuration based on the first performance parameters and the second performance parameters; and
outputting the optimized virtual warehouse configuration.

9. The method of claim 8, wherein generating the testing database comprises generating a zero-copy clone of the one or more databases.

10. The method of claim 8, wherein determining the log of the plurality of different events comprises logging one or more queries executed with respect to the one or more databases.

11. The method of claim 8, wherein replaying the plurality of different events at the testing database comprises:
causing each of the plurality of different events to be initiated via the first virtual warehouse at a different time.

12. The method of claim 8, wherein the plurality of different events comprise one or more of:
a write action to a database of the one or more databases; or
a read action to the database of the one or more databases.

13. The method of claim 8, wherein predicting the optimized virtual warehouse configuration further comprises:
training, using training data, a machine learning model to output a recommended virtual warehouse configuration, wherein the training data comprises a history of different virtual warehouse configurations and a history of different event processing times;
providing, to the trained machine learning model, input comprising the first performance parameters and the second performance parameters; and
receiving, from the trained machine learning model, output indicating the optimized virtual warehouse configuration.

14. The method of claim 8, wherein the performance parameters indicate a processing time corresponding to each of the plurality of different events.

15. One or more non-transitory computer-readable media storing instructions that, when executed by one or more processors of a computing device, cause the computing device to:
generate a testing database that corresponds to a state of one or more databases managed by a data sharing platform at a point in time, wherein the data sharing platform enables users to access the one or more databases managed by the data sharing platform, wherein the data sharing platform is configured to provide access to the data stored by the data sharing platform via one or more of a plurality of virtual warehouses, wherein each of the plurality of virtual warehouses comprises a respective set of computing resources configured to:
execute one or more queries with respect to at least a portion of a plurality of data warehouses;
collect results from the one or more queries; and
provide access to the collected results;
determine a log of a plurality of different events executed, via one or more of the plurality of virtual warehouses and after the point in time, with respect to the one or more databases;
predict an optimized virtual warehouse configuration for a first virtual warehouse by:
identifying a first subset of the plurality of different events based on determining that the first subset of the plurality of different events were conducted during a first time period;
identifying a second subset of the plurality of different events based on determining that the second subset of the plurality of different events were conducted during a second time period;
measuring first performance parameters a first warehouse configuration by replaying, via the first virtual warehouse, the first subset of the plurality of different events at the testing database while the first virtual warehouse is configured in accordance with the first warehouse configuration, wherein the plurality of different warehouse configurations each correspond to a different set of computing resources available to the first virtual warehouse, and wherein the replaying the first subset of the plurality of different events comprises replaying a same event of the first subset of the plurality of different events at least twice;
modifying the testing database by rolling the testing database back to the state of the one or more databases managed by the data sharing platform at the point in time;
measuring second performance parameters of a second warehouse configuration by replaying, via the first virtual warehouse, the second subset of the plurality of different events at the testing database while the first virtual warehouse is configured in accordance with the second warehouse configuration, wherein the replaying the second subset of the plurality of different events comprises inserting one or more random delays between the initiation of at least two of the second subset of the plurality of different events; and selecting the optimized virtual warehouse configuration based on the first performance parameters and the second performance parameters; and output the optimized virtual warehouse configuration.

16. The computer-readable media of claim 15, wherein the instructions, when executed by the one or more processors, cause the computing device to generate the testing database by a data sharing platform by causing the computing device to generate a zero-copy clone of the one or more databases.

17. The computer-readable media of claim 15, wherein the instructions, when executed by the one or more processors, cause the computing device to determine the log of the plurality of different events by causing the computing device to log one or more queries executed with respect to the one or more databases.

18. The computer-readable media of claim 15, wherein the instructions, when executed by the one or more processors, cause the computing device to replay the plurality of different events at the testing database by causing the computing device to:

cause each of the plurality of different events to be initiated via the first virtual warehouse at a different time.

19. The computer-readable media of claim 15, wherein the plurality of different events comprise one or more of:

a write action to a database of the one or more databases; or a read action to the database of the one or more databases.

20. The computer-readable media of claim 15, wherein the instructions, when executed by the one or more processors, cause the computing device to predict the optimized virtual warehouse configuration by further causing the computing device to:

train, using training data, a machine learning model to output a recommended virtual warehouse configuration, wherein the training data comprises a history of different virtual warehouse configurations and a history of different event processing times;

provide, to the trained machine learning model, input comprising the performance parameters; and receive, from the trained machine learning model, output indicating the optimized virtual warehouse configuration.

* * * * *